United States Patent [19]

Snyder et al.

[11] 4,374,733
[45] Feb. 22, 1983

[54] METHOD FOR TREATING AQUEOUS MEDIUMS

[75] Inventors: William R. Snyder, Warminster; Diane Feuerstein, Bensalem, both of Pa.

[73] Assignee: Betz Laboratories, Inc., Trevose, Pa.

[21] Appl. No.: 249,774

[22] Filed: Apr. 1, 1981

[51] Int. Cl.³ .................................................. C02F 5/10
[52] U.S. Cl. .................................... 210/701; 210/698; 252/180
[58] Field of Search ............... 210/701, 733, 698, 700; 252/180; 203/7

[56] References Cited

U.S. PATENT DOCUMENTS

| | | | |
|---|---|---|---|
| 3,715,307 | 2/1973 | Johnson et al. | 210/701 |
| 4,029,577 | 6/1977 | Godlewski et al. | 210/701 |
| 4,048,066 | 9/1977 | Cuisia et al. | 210/701 |
| 4,223,120 | 9/1980 | Kurowsky | 210/701 |
| 4,288,327 | 9/1981 | Godlewski et al. | 210/698 |

Primary Examiner—Benoit Castel
Attorney, Agent, or Firm—Alexander D. Ricci; Bruce E. Peacock

[57] ABSTRACT

Methods are disclosed for inhibiting scale formation and dispersing solids particulate matter in aqueous mediums. An acrylic acid/lower alkyl hydroxy acrylate copolymer (I) in combination with a water soluble polymeric material (II) having the formula

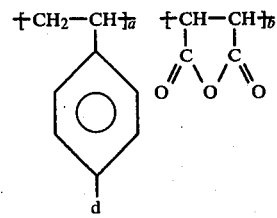

wherein a or b may be zero or a positive integer, with the proviso that $a+b>1$; and wherein d is H or $HSO_3$, are disclosed. The method comprises administering from about 0.1–500 parts (based upon 1 million parts of the aqueous medium treated) of the combined treatment (I and II) to the particular aqueous system for which treatment is desired.

15 Claims, No Drawings

METHOD FOR TREATING AQUEOUS MEDIUMS

FIELD OF THE INVENTION

The present invention relates to a method for controlling the formation and deposition of scale forming salts, particularly calcium carbonate, calcium phosphate, and calcium sulfate, in aqueous mediums. The methods of the present invention also disperse suspended particulate matter, such as clay and iron oxides.

BACKGROUND OF THE INVENTION

Although the invention has general applicability to any given system where the formation and deposition of calcium carbonate, calcium phosphate and/or calcium sulfate is a potential problem, or where other problems due to deposition of suspended matter such as iron oxide and clay, are encountered, the invention will be discussed in detail as it concerns cooling water and boiling water systems.

The term "cooling water" is applied whenever water is circulated through equipment to absorb and carry away heat. This definition includes air conditioning systems, engine jacket systems, refrigeration systems as well as the multitude of industrial heat exchange operations, such as found in oil refineries, chemical plants, steel mills, etc.

The once-through cooling system, as the name implies, is one in which the water is passed through the heat exchange equipment and the cooling water is then discharged to waste. Usually, a once-through system is employed only where water at suitably low temperature is readily available in large volume and at low cost. The normal source of once-through cooling water is from wells, rivers and lakes where the cost involved is that of pumping only. In a once-through system, no evaporation takes place and consequently the water does not concentrate. Circulating water characteristics are the same as the makeup water.

The use of a recirculating system, in which a cooling tower, spray pond, evaporative condenser and the like serve to dissipate heat, permits great economy in makeup water requirements. With dwindling supplies of fresh cold water available for industries' cooling requirements, increased use must be made of recirculating systems in which the cooling water is used over and over again.

After passage of the circulating water through the heat exchange equipment, the water is cooled when passing over the cooling tower. This cooling effect is produced by evaporation of a portion of the circulating water in passing over the tower. By virtue of the evaporation which takes place in cooling, the dissolved solids and suspended solids in the water become concentrated.

The circulating water becomes more concentrated than the makeup water due to this evaporation loss. Cycles of concentration is the term employed to indicate the degree of concentration of the circulating water as compared with the makeup. For example, two cycles of concentration indicates the circulating water is twice the concentration of the makeup water.

Deposits in lines, heat exchange equipment, etc., may originate from several causes. For example, the precipitation of calcium sulfate and calcium phosphate will form scale. In addition, solids foulant particles may enter the system. Through collisions with neighboring solids particles, these foulants may agglomerate to a point where they either foul a heat transfer surface or begin to accumulate in lower flow areas of the system. On the other hand, corrosion is the electrochemical reaction of a metal with its environment. It is a destructive reaction and, simply stated, is the reversion of refined metals to their natural state. For example, iron ore is iron oxide. Iron ore is refined into steel. When steel corrodes, it also forms iron oxide.

In speaking of deposits which form in cooling water systems, it is important to bear in mind the mechanism causing the deposit, otherwise confusion may result. In general, the term "scale" applies to deposits which result from crystallization or precipitation of salts from solution. Wasting away of a metal is the result of corrosion. The agglomeration of suspended solids particles also results in deposit formation. While a deposit results in all of these cases, the mechanisms of formation are different and different corrective methods are required to prevent each type of deposit.

Some of the factors which affect scale formation are temperature, rate of heat transfer, the calcium, sulfate, magnesium, silica, phosphate, alkalinity, dissolved solids and pH of the water.

In the past in order to minimize the formation of the scale forming salts, cooling water systems were operated at pH's where the solubility of the "hardness" or "scale forming" ions was the greatest. Because the pH's of the systems were acidic, corrosion inhibitors together with dispersants were the normal treatment. Corrosion inhibition in most instances required chromate treatment. With the advent of tight control regarding toxic pollutant discharge, operating parameters of cooling water systems had to be changed in an attempt to utilize non-chromate treatment. The development of high pH and/or non-chromate corrosion programs over the past few years has concurrently enhanced the potential for heat exchange fouling due to chemical precipitation. Presently, most non-chromate treatments include phosphate and/or phosphonic acid compounds, such as the alkali metal polyphosphates, organophosphates, e.g., phosphate esters, etc., amino-trimethylenephosphonic acid, hydroxy ethylidene diphosphonic acid, and water soluble salts thereof. However, the reversion of the polyphosphates and the organic phosphates plus the use of alkaline operating conditions leads to the formation and deposition of the highly insoluble calcium phosphate. Also since there may be phosphate in the makeup water supply, for example, tertiary sewage treatment effluent for makeup water, calcium phosphate scaling has become one of the major problems encountered. Of course, the formation of calcium sulfate in cooling water systems also results in a scale formation problem. Calcium sulfate is often associated with the use of sulfuric acid for pH control, especially in connection with sidestream softening, and with the greater calcium concentrations associated with higher cycles of concentration.

Another principal scale-forming material encountered in cooling water systems is calcium carbonate formed by the decomposition of calcium bicarbonate. This compound has an inverse solubility curve (i.e., the solubility decreases as the system temperature increases), and its solubility is lower than most of the other potential scale imparting moieties that may be present in cooling systems. Calcium carbonate is soluble in acidic solutions, but since most cooling systems are operated at alkaline conditions to retard corrosion, calcium carbonate scaling remains a problem.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, PA, Pages 85–96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, those operations are only moderately effective. In all cases, external treatment does not in itself provide adequate treatment since muds, sludge, silts and hardness-imparting ions escape the treatment, and eventually are introduced into the steam generating system. The problems which result from their introduction into the steam generating system are apparent. Since the deposit forming materials are present, they have a tendency to accumulate upon concentration of the water and to settle at points in the system where there is low flow, thus restricting water circulation. The baking of mud and/or sludge on tubes and sheets will result in overheating and failure, thereby requiring downtime for repair or replacement of the structural parts. In addition, mud, sludge and silts may become incorporated in scale deposits adding to their volume and heat insulating effect.

Accordingly, internal treatments have been necessary to maintain the mud and silts in a suspended state. These internal treatments have been generally referred to in the industry as sludge conditioning agents.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their deposition. The carbonates of magnesium and calcium are not the only problem compounds as regards scale, but also waters having high contents of phosphate, sulfate or silicate ions either occurring naturally or added for other purposes cause problems since calcium and magnesium, and any iron or copper present, react with each and deposit as boiler scale. As is obvious, the deposition of scale on the structural parts of a steam generatng system causes poorer circulation and lower heat transfer capacity, resulting accordingly in an overall loss in efficiency.

Although the foregoing is directed for the most part to cooling water systems and boiler water systems, or more specifically steam generating systems, the same problems occur in scrubber systems and the like. Any aqueous system having calcium and magnesium cations and the exemplified anions, particularly the phosphate and sulfate anions, will experience the formation and deposition of scaling salts.

Many and different type materials have been used for the treatment of water systems. Of the vast number may be mentioned alginates, lignins, lignosulfonates, tannins, carboxymethyl cellulose materials, and synthetic polymers such as polyacrylates and polymethacrylates. For instance, in U.S. Pat. No. 4,029,577 (Godlewski et al), of common assignment herewith, certain acrylic acid/hydroxylated lower alkyl acrylate copolymers are disclosed as being effective in controlling the formation and deposition of scale and/or suspended solid matter which otherwise would occur in aqueous mediums containing scale imparting ions and dispersed particles. In U.S. Pat. No. 3,663,448 (Ralston), the formation of solid scale-forming salts in aqueous solution is inhibited by adding to the solution small amounts of certain amino phosphonate compounds, together with a water soluble polymer having a molecular weight from about 500 to about 12,000 selected from the group consisting of polyacrylic acid, copolymers of acrylic acid and up to 50% acrylamide and polyacrylamide in which at least 50% of the amide groups are hydrolyzed.

U.S. Pat. No. 4,209,398 (Ii et al) discloses yet another water treating process wherein a polymer having a structural unit derived from a monomer having an ethylenically unsaturated bond and having one or more COOH radicals is combined with inorganic phosphates, phosphonic acids, organic phosphonic acid esters, or polyvalent metal salts, to prevent scale formation and corrosion.

U.S. Pat. Nos. 2,723,956 (Johnson); and 3,549,538 (Jacklin); also disclose varied approaches in the water treatment area. For instance, the '956 Johnson patent discloses a boiler scale treatment which comprises copolymers of maleic anhydride and other polymerizable mono-ethylenic compounds such as methyl vinyl ether, ethyl vinyl ether, styrene, alpha-methyl styrene, vinyl acetate, methyl methacrylate, isopentene, amylene, diisobutylene, isoheptene, nonene, dipentene, ethyl cinnamate or abietic acid.

In the '538 Jacklin patent, disclosed are scale inhibition compositions and methods comprising a nitrilo phosphonate or nitrilo carboxylate compound, such as, nitrilotriacetic acid or nitrilomethylene phosphonic acid, and a water soluble sulfoxy free polar addition polymer having a molecular weight of at least 1,000. Preferred classes of the water soluble sulfoxy-free polar addition polymers comprise maleic anhydride-styrene copolymers and acrylic acid homo and copolymers.

Despite the efforts of the prior art, the water treatment industry is constantly searching for means for inhibiting scale formation and/or for dispersing solids particulate matter, efficiently and in a cost effective manner.

GENERAL DESCRIPTION OF THE INVENTION

The present inventors have discovered that acrylic acid/lower alkyl hydroxy acrylate copolymers (I) in combination with a water soluble polymeric material (II) are particularly effective in: (1) inhibiting the formation of scale forming salts, including calcium sulfate, calcium carbonate, and calcium phosphate, and (2) dispersing solids particulate matter. The polymeric material (II) may be represented by the formula:

Polymer Material II

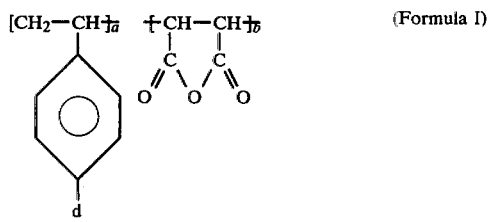

(Formula I)

wherein a or b may be zero or a positive integer, with the proviso that $a+b>1$; and wherein d is H or $HSO_3$. It is to be noted that water soluble salts of the compounds represented by the above formula are also efficacious. Also, with respect to the polymaleic anhydride monomer (monomer b), this may hydrolyse to acid form when admitted to the aqueous system to be treated. It should thus be noted that all such hydrolysed acid forms are within the scope of the present invention.

The specific acrylic acid/lower alkyl hydroxy acrylate copolymers (I) utilized in accordance with the present invention are disclosed in U.S. Pat. No. 4,029,577 (Godlewski et al). The entire disclosure of this patent is accordingly incorporated by reference.

As to the polymers (II) represented by the above Formula, which are to be utilized in the combined treatment, sulfonated styrene/maleic anhydride copolymers, styrene/maleic anhydride copolymers, maleic anhydride homopolymers, and sulfonated styrene homopolymers are preferred.

Specifically, the sulfonated styrene/maleic anhydride copolymers which may be used are represented by the formula:

Polymeric Material II

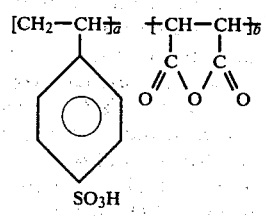

(Formula II)

Preferably, the sulfonated styrene/maleic anhydride copolymers comprise a mole ratio a:b of from about 2:1 to about 4:1 and preferably about 2:1 to about 3:1, and possess a molecular weight of from 500 to 100,000. The specific molecular weight is not thought to be critical, as long as the resulting polymer is water soluble. One preferred polymer encompassed by Formula II above is sold by the National Starch Company, under the trademark "Versa-TL-3". This copolymer has a molar ratio a:b of 3:1 and a molecular weight of about 1500.

As to the styrene/maleic anhydride copolymers which may be effectively used as part of the combined treatment, those encompassed by the following formula are exemplary Polymeric Material II

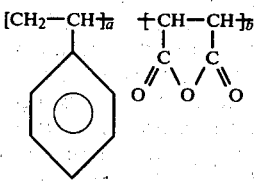

(Formula III)

Copolymers within the scope of Formula III which are thought to be useful for present purposes include those wherein the molar ratio a:b is between 1:1 and 3:1. The molecular weight of a Formula III polymer suitable for the present purpose is thought to be between about 500 to about 50,000. One preferred styrene/maleic anhydride copolymer within the ambit of Formula III is sold by Arco Chemical under the trademark "SMA 1000".

This particular copolymer has a molar ratio a:b of 1:1 and the molecular weight thereof is 1,600.

Turning to the sulfonated styrene homopolymer which may successfully be employed in combination with the acrylic acid/lower alkyl hydroxy acrylate copolymer (I) in the particular system to be treated, those within the scope of Formula IV (following) are thought useful.

Polymeric Material II

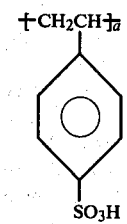

(Formula IV)

Water soluble polymers covered by Formula IV, having a molecular weight of between about 1,000 to 100,000 are thought to be efficacious. One such sulfonated polystyrene homopolymer is sold by National Starch Company under the trademark "Versa TL-70." This particular polymer has a molecular weight of about 70,000.

The water soluble polymaleic anhydride polymer which may be used as part of the combined treatment is represented by the formula Polymeric Material II

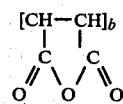

(Formula V)

The polymaleic anhydride polymer useful for the present purposes will have a molecular weight of between about 500 and 5,000. One such polymer is sold by Ciba-Geigy under the trademark "Belclene 200." This particular polymer has a molecular weight of between about 800–1000.

The polymers (I) which are to be utilized in conjunction with the polymeric component (II) in the combined treatment are those containing essentially moieties (a) derived from an acrylic acid compound, i.e., Polymeric Material I

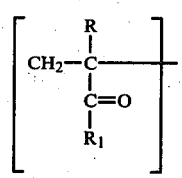

Formula VI where R is hydrogen or a lower alkyl of from 1 to 3 carbon atoms and $R_1=OH$, OM, $NH_2$, where M is a water soluble cation, e.g., $NH_4$, alkali metal (K, and Na), etc.; and (b) moieties of an hydroxylated lower alkyl (C=2–6) acrylate as represented for example by the formula Polymeric Material I -continued

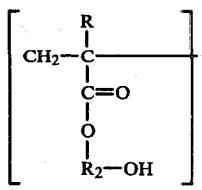

Formula VII where R is H, or CH$_3$ and R$_2$ is a lower alkyl having from about 2 to 6 carbon atoms (the OH moiety may be attached to any of the C atoms in the alkyl group).

These polymers most advantageously have a mole ratio of moieties derived from an acrylic acid compound (Formula VI) to hydroxy alkyl acrylate derived moieties of from about 34:1 to about 1:4, and preferably 11:1 to 1:2, and possess a molecular weight of from 500 to 1,000,000 and preferably 1,000 to 500,000. The only criteria that is of importance that applies to the molar ratios of the described monomers in the copolymer, is that it is desirable to have a copolymer which is soluble in water. It should be noted that as the proportion of hydroxylated alkyl acrylate moieties increase, the solubility of the copolymer decreases.

The polymers (I) utilized in accordance with the invention can be prepared by vinyl addition polymerization or by treatment of an acrylic acid or salt polymer. More specifically, acrylic acid or derivates thereof or their water soluble salts, e.g., sodium, potassium, ammonium, etc. can be copolymerized with the hydroxy alkyl acrylate under standard copolymerization conditions utilizing free radicals such as benzoyl peroxide, azo bisisobutyronitrile or redox initiators such as ferrous sulfate and ammonium persulfate. The molecular weights of the resulting copolymer can be controlled utilizing standard chain control agents such as secondary alcohols (isopropanol), mercaptans, halocarbons, etc. Copolymers which may be utilized in accordance with the present invention are commercially available from National Starch Company. One preferred copolymer is sold by National Starch under the trademark "Natrol 42". This particular copolymer is an acrylic acid/2-hydroxypropyl acrylate copolymer having an acrylic acid: 2-hydroxypropyl acrylate molar ratio of 3:1 and a molecular weight of about 6000.

The hydroxyalkyl acrylate can be prepared by the addition reaction between the acrylic acid or its derivatives or water soluble salts and the oxide of the alkyl derivative desired. For example, the preferred monomer of the present invention is the propyl derivative. Accordingly, to obtain the hydroxylated monomer, acrylic acid is reacted with propylene oxide to provide the hydroxy propylacrylate monomer constituent of the copolymer utilized in accordance with the present invention.

The polymers of the present invention may also be prepared by reacting the polyacrylic acid or derivatives thereof with an appropriate amount of an alkylene oxide having from 2 to 6 carbon atoms such as ethylene oxide, propylene oxide and the like. The reaction takes place at the COOH or COM group of the moieties to provide the hydroxylated alkyl acrylate moiety.

The preferred copolymer prepared either by copolymerization or by reaction of polyacrylic acid or acrylate with the propylene oxide would be composed of units or moieties having the structural formulas Polymeric Material I

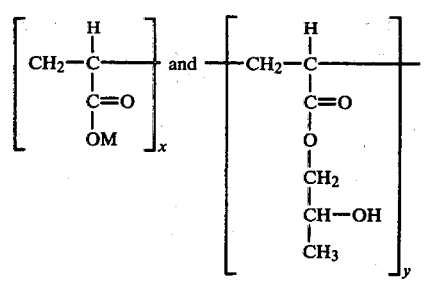

(Formula VIII)

where M is as earlier defined and wherein the molar ratio of x to y is preferably 11:1 to 1:2. The copolymer preferably has a molecular weight of from 1,000 to 500,000.

The operable molar ratio of polymeric material I to polymeric material II, in accordance with the invention, is from about 10:1 to 1:10. The preferred molar ratio of polymer I:polymer II is about 1:1 to 3:1.

The combined treatment (polmyer I and polymer II) should be added to the desired aqueous system in an amount effective for the purpose, taking into consideration the respect of concentrations in the water of the potential scale and deposit forming species, the pH of the water and the chemical and physical properties of the combined treatment. The criteria for proper treatment of any aqueous system would be apparent to the worker in the art of water treatment. For the most part, the combined treatment will be effective when utilized at levels of from about 0.1 to 500 parts per million of water. Based upon experimental data, the preferred polymeric material II is polymaleic anhydride. The preferred combined treatment comprises administering to an aqueous medium from about 2–20 parts of acrylic acid/2 hydroxypropylacrylate-polymaleic anhydride (molar ratio of the acrylate polymer:polymaleic anhydride=3:1) per one million parts of the aqueous medium to be treated.

SPECIFIC EMBODIMENTS OF THE INVENTION

The invention will now be further described with reference to a number of specific examples which are to be regarded solely as illustrative, and not as restricting the scope of invention.

One method of evaluating deposit control activity of a material consists of measuring its ability to prevent bulk phase precipitation of the salt at conditions for which the salt would usually precipitate. It is additionally important to recognize that the material being evaluated is tested at "substoichiometric" concentrations. That is, typical molar ratios of precipitating cation to the material being evaluated are on the order of 20:1 and much greater. Consequently, stoichiometric sequestration is not the route through which bulk phase precipitation is prevented. The well known phenomenon is also called "threshold" treatment and is widely practiced in water treatment technology for the prevention of scale (salt) deposits from forming on various surfaces. In the results that follow calcium phosphate, calcium carbonate, and calcium sulfate salts commonly found in industrial water systems under various conditions have been selected as precipitants. The combined treatment of the present invention has been evaluated for its ability to prevent precipitation (i.e., inhibit crystallization) of these salts. The results are expressed as "percent inhibition", positive values indicate the stated percentage of the precipitate was prevented from being formed. Except as where noted to the contrary, the following conditions, solutions, and testing procedure were utilized to perform the calcium carbonate, calcium phosphate and calcium sulfate inhibition tests, the results of which are reported herein below in the following Tables.

CALCIUM PHOSPHATE INHIBITION PROCEDURE

| Conditions | Solutions |
|---|---|
| T = 70° C. | 36.76 $CaCl_2.2H_2O$/liter $DIH_2O$ |
| pH 8.5 | 0.4482g $Na_2HPO_4$/liter $DIH_2O$ |
| 17 hour equilibration | |
| $Ca^{+2}$ = 250 ppm as $CaCO_3$ | |
| $PO_4^{-3}$ = 6 ppm | |

Procedure (1) To about 1800 ml $DiH_2O$ in a 2 liter volumetric flask, add 20 ml of $CaCl_2.2H_2O$ solution followed by 2 drops of conc. HCl.
(2) Add 40 ml of $Na_2HPO_4$ solution.
(3) Bring volume to 2 liters with DI water.
(4) Place 100 ml aliquots of solution in 4 oz glass bottles.
(5) Add treatment.
(6) Adjust pH as desired.
(7) Place in 70° C. water bath and equilibrate for 17 hours.
(8) Remove samples and filter while hot through 0.2 $\mu$ filters.
(9) Cool to room temperature and take Absorbance measurements using Leitz photometer (640 nm).
Preparation for Leitz
  a. 5 mls filtrate
  b. 10 mls Molybdate Reagent
  c. 1 dipper Stannous Reagent
  d. Swirl 1 minute, pour into Leitz cuvette; wait 1 minute before reading.
(10) Using current calibration curve (Absorbance vs ppm $PO_4^{-3}$) find ppm $PO_4^{-3}$ of each sample.
Calculation % Inhibition =

$$\frac{\text{ppm } PO_4^{-3} \text{ (treated)} - \text{ppm } PO_4^{-3} \text{ (control)}}{\text{ppm } PO_4^{-3} \text{ (stock)} - \text{ppm } PO_4^{-3} \text{ (control)}} \times 100$$

CALCIUM SULFATE INHIBITION PROCEDURE

| Conditions | Chemicals |
|---|---|
| pH = 7.0 | 1 × $10^{-1}$ M $CaCl_2.2H_2O$ |
| T = 50° C. | 1 × $10^{-1}$ $Na_2SO_4$ |
| 24 hr. equilibrium | |
| $Ca^{+2}$ = 2000 ppm | |
| $SO_4^{-2}$ = 4800 ppm | |

Procedure (1) Add 50 ml of $10^{-1}$ $CaCl_2.2H_2O$ pre-adjusted to pH 7.0 to a 4 oz. bottle.
(2) Add treatment.
(3) Add 50 ml of $10^{-1}$ $Na_2SO_4$ pre-adjusted to pH 7.0.
(4) Heat samples for 24 hours in a 50° C. water bath.
(5) Cool for 30 minutes, at least.
(6) Filter 5 ml through 0.45 $\mu$ filters.
(7) Add NaOH to pH 12.0 and dilute to 50 ml with DI $H_2O$.
(8) Add $Ca^{+2}$ indicator (1 level).
(9) Titrate to purple-violet endpoint with EDTA.
Calculation % Inhibition =

$$\frac{\text{mls titrant (treated)} - \text{mls titrant (control)}}{\text{mls titrant } (Ca^{+2} \text{ stock)} - \text{mls titrant (control)}} \times 100$$

CALCIUM CARBONATE INHIBITION

| Conditions | Solutions |
|---|---|
| pH = 9.0, 8.5 | 3.25g $CaCl_2.2H_2O$/liter DI $H_2O$ |
| T = 70° C. | 2.48g $Na_2CO_3$/liter DI $H_2O$ |
| 5 hour equilibrium | |
| 442 ppm $Ca^{+2}$ | |
| 702 ppm $CO_3^{-2}$ | |

PROCEDURE (1) Add 50 ml $CaCl_2.2H_2O$ pre-adjusted to pH 9.0
(2) Add treatment
(3) Add 50 ml $Na_2CO_3$ pre-adjusted to pH 9.0
(4) Heat 5 hours at 70° C. water bath. Remove and cool to room temperature.
(5) Filter 5 mls through 0.2 $\mu$filters.
(6) Adjust samples to pH <1.0 with conc. HCl (1 g Conc. HCl)
(7) Allow to stand at least 15 minutes.
(8) Dilute to 50 mls with DI $H_2O$.
(9) Bring pH to 12.0 with NaOH.
(10) Add $Ca^{+2}$ indicator (1 level).
(11) Titrate with EDTA to purple-violet endpoint.
Calculation % Inhibition =

$$\frac{\text{ml } EDTA \text{ titrated (treated)} - \text{ml } EDTA \text{ titrated (control)}}{\text{ml } EDTA \text{ titrated } (Ca^{+2} \text{ stock} - \text{ml } EDTA \text{ titrated (control)}} \times 100$$

TABLE I (AA/HPA + Sulfonated Styrene/Maleic Anhydride Copolymer)

| Molar Ratio AA/HPA:SS/MA | ppm | % Inhibition $CaCO_3$ | $CaSO_4$ | ppm | $Ca_3(PO_4)_2$ |
|---|---|---|---|---|---|
| 1:0 | ½ | 0.0 | 13.7 | 2 | 3.9 |
|  | 1 | 9.5 | 31.8 | 4 | 1.7 |
|  | 2 | 32.3 | 97.2 | 8 | 93.3 |
|  | 2.5 | 44.1 | — | — | — |
|  | 5.0 | 61.4 | — | — | — |
|  | 10.0 | 53.3 | — | — | — |
| 0:1 | ½ | 12.7 | 5.0 | 2 | 0.8 |
|  | 1 | 7.4 | 7.8 | 4 | 6.6 |
|  | 2 | 5.3 | 7.4 | 8 | 66.4 |
|  | 2.5 | 6.1 | — | — | — |
|  | 5.0 | 4.2 | — | — | — |
|  | 10.0 | 9.7 | — | — | — |
| 1:1 | ½ | 10.1 | 9.0 | 2 | 0 |
|  | 1 | 0 | 20.7 | 4 | 14.5 |
|  | 2 | 14.3 | 42.6 | 8 | 75.1 |
|  | 2.5 | 12.7 | — | — | — |
|  | 5.0 | 32.0 | — | — | — |

TABLE I-continued (AA/HPA + Sulfonated Styrene/Maleic Anhydride Copolymer)

| Molar Ratio AA/HPA:SS/MA | ppm | % Inhibition CaCO₃ | CaSO₄ | ppm | Ca₃(PO₄)₂ |
|---|---|---|---|---|---|
|  | 10.0 | 46.1 | — | — | — |
| 1:3 | ½ | 14.3 | 5.2 | 2 | 1.1 |
|  | 1 | 0 | 13.1 | 4 | 6.0 |
|  | 2 | 5.3 | 29.4 | 8 | 76.0 |
|  | 2.5 | 2.0 | — | — | — |
|  | 5.0 | 12.4 | — | — | — |
|  | 10.0 | 7.8 | — | — | — |
| 3:1 | ½ | 0 | 8.3 | 2 | 6.0 |
|  | 1 | 4.2 | 26.3 | 4 | 10.7 |
|  | 2 | 21.7 | 66.9 | 8 | 83.1 |
|  | 2.5 | 30.6 | — | — | — |
|  | 5.0 | 47.1 | — | — | — |
|  | 10.0 | 38.7 | — | — | — |

AA/HPA = acrylic acid/2-hydroxypropyl acrylate copolymer, molar ratio AA/HPA = 3:1, molecular weight ≈ 6,000
SS/MA = "Versa TL-3" sulfonated styrene/maleic anhydride copolymer, molar ratio PSS/MA ≈ 3:1 molecular weight ≈ 1500

TABLE II (Ca₃(PO₄)₂ Inhibition AA/HPA + SS/MA)

| Material | ppm (active) | % Inhibition |
|---|---|---|
| AA/HPA | 2.0 | 4.0 |
| SS/MA | 2.0 | 1.0 |
| AA/HPA | 2.0 | } 15.0 |
| SS/MA | 2.0 |  |
| AA/HPA | 3.0 | 4.0 |
| SS/MA | 3.0 | 2.0 |
| AA/HPA | 3.0 | } 52.0 |
| SS/MA | 3.0 |  |
| AA/HPA | 4.0 | 1.7 |
| SS/MA | 4.0 | 6.6 |
| AA/HPA | 4.0 | } 75.1 |
| SS/MA | 4.0 |  |
| AA/HPA | 1.0 | 1.0 |
| SS/MA | 3.0 | 2.0 |
| AA/HPA | 1.0 | } 15.0 |
| SS/MA | 3.0 |  |
| AA/HPA | 1.5 | 3.0 |
| SS/MA | 4.5 | 15.0 |
| AA/HPA | 1.5 | } 52.0 |
| SS/MA | 4.5 |  |
| AA/HPA | 2.0 | 3.9 |
| SS/MA | 6.0 | 41.0 |
| AA/HPA | 2.0 | } 76.0 |
| SS/MA | 6.0 |  |
| AA/HPA | 3.0 | 3.0 |
| SS/MA | 1.0 | 0.0 |
| AA/HPA | 3.0 | } 11.0 |
| SS/MA | 1.0 |  |
| AA/HPA | 4.5 | 17.0 |
| SS/MA | 1.5 | 0.6 |
| AA/HPA | 4.5 | } 57.0 |
| SS/MA | 1.5 |  |
| AA/HPA | 6.0 | 64.0 |
| SS/MA | 2.0 | 0.8 |
| AA/HPA | 6.0 | } 83.1 |
| SS/MA | 2.0 |  |

AA/HPA = acrylic acid/2-hydroxypropyl acrylate copolymer, molar ratio AA/HPA = 3:1 molecular weight ≈ 6000
S/MA = "Versa TL-3", sulfonated styrene/maleic anhydride copolymer molar ratio PSS/MA ≈ 3:1 molecular weight ≈ 1500

In Table II, it can clearly be seen that the combination of AA/HPA (Polymer I and SS/MA (Polymer II provides deposit control activity that is greater than expected from the activity of the individual materials. Although the combined treatment of AA/HPA and SS/MA is especially efficacious in inhibiting calcium phosphate formation, Table I indicates that this combined treatment also serves as an inhibiting treatment for calcium carbonate and calcium sulfate salts as well.

TABLE III (AA/HPA + Styrene/Maleic Anydride Copolymer)

| Ratio of AA/HPA: SMA | ppm | % Inhibition CaCO₃ | CaSO₄ | ppm | Ca₃(PO₄)₂ |
|---|---|---|---|---|---|
| 1:0 | ½ | 0.0 | 14.8 | 2 | 2.7 |
|  | 1 | 0.0 | 47.8 | 4 | 9.7 |
|  | 2 | 27.7 | 100.0 | 5 | 4.3 |
|  | 2.5 | 48.3 | — | 8 | 71.4 |
|  | 5.0 | 65.8 | — | 10 | 89.3 |
|  | 10.0 | 81.2 | — | 20 | 100.0 |
| 0:1 | ½ | 0.0 | 0.5 | 2 | 0.0 |
|  | 1 | 0.0 | 3.3 | 4 | 0.0 |
|  | 2 | 0.0 | 12.0 | 5 | 1.6 |
|  | 2.5 | 16.1 | — | 8 | 3.7 |
|  | 5.0 | 26.2 | — | 10 | 13.9 |
|  | 10.0 | 30.2 | — | 20 | 11.1 |
| 1:1 | ½ | 0.0 | 6.0 | 2 | 0.0 |
|  | 1 | 0.0 | 27.3 | 4 | 5.2 |
|  | 2 | 9.6 | 92.6 | 5 | 5.3 |
|  | 2.5 | 35.6 | — | 8 | 15.8 |
|  | 5.0 | 47.7 | — | 10 | 8.4 |
|  | 10.0 | 54.4 | — | 20 | 29.6 |
| 1:3 | ½ | 0.0 | 13.6 | 2 | 0.0 |
|  | 1 | 0.0 | 15.1 | 4 | 1.2 |
|  | 2 | 0.0 | 46.4 | 5 | 4.6 |
|  | 2.5 | 18.8 | — | 8 | 9.5 |
|  | 5.0 | 30.9 | — | 10 | 10.5 |
|  | 10.0 | 36.9 | — | 20 | 9.7 |
| 3:1 | ½ | 0.0 | 10.2 | 2 | 1.0 |
|  | 1 | 0.0 | 43.5 | 4 | 2.2 |
|  | 2 | 7.1 | 99.0 | 5 | 7.2 |
|  | 2.5 | 49.0 | — | 8 | 18.4 |
|  | 5.0 | 59.1 | — | 10 | 32.6 |
|  | 10.0 | 69.1 | — | 20 | 39.5 |

AA/HPA = same as in Tables I and II
SMA = "SMA 1,000", styrene/maleic anhydride copolymer, styrene:maleic anhydride ratio = 1:1, molecular weight = 1,600

Here, the combined AA/HPA+SMA treatment is shown to be exceptionally effective in controlling CaSO₄ deposit formation. However, the combined treatment, at certain dosage levels and in certain molar combinations of the individual components, is also effective in inhibiting and controlling calcium carbonate and calcium phosphate scale accumulation.

TABLE IV (Inhibition of CaSO₄ Precipitation from Solution Using AA/HPA and SMA)

| Material | ppm (active) | % Inhibition |
|---|---|---|
| AA/HPA | 0.5 | 14.8 |
| SMA | 0.5 | 0.5 |
| AA/HPA | 0.5 | } 27.3 |
| SMA | 0.5 |  |
| AA/HPA | 0.75 | 30.0 |
| SMA | 0.75 | 2.0 |
| AA/HPA | 0.75 | } 69.0 |
| SMA | 0.75 |  |
| AA/HPA | 1.0 | 47.8 |
| SMA | 1.0 | 3.3 |
| AA/HPA | 1.0 | } 92.6 |
| SMA | 1.0 |  |
| AA/HPA | 0.25 | 3.0 |
| SMA | 0.75 | 2.0 |
| AA/HPA | 0.25 | } 15.1 |
| SMA | 0.75 |  |
| AA/HPA | 0.5 | 14.8 |

TABLE IV-continued (Inhibition of CaSO$_4$ Precipitation from Solution Using AA/HPA and SMA)

| Material | ppm (active) | % Inhibition |
|---|---|---|
| SMA | 1.5 | 9.0 |
| AA/HPA | 0.5 | } 46.4 |
| SMA | 1.5 | |
| AA/HPA | 0.75 | 30.0 |
| SMA | 0.25 | 0.2 |
| AA/HPA | 0.75 | } 43.5 |
| SMA | 0.25 | |
| AA/HPA | 1.5 | 83.0 |
| SMA | 0.5 | 0.5 |
| AA/HPA | 1.5 | } 99.0 |
| SMA | 0.5 | |

AA/HPA = same as Table I
SMA = same as Table III

In Table IV, it is clearly demonstrated that the combination of AA/HPA with SMA provides deposit control activity, with respect to CaSO$_4$ formation, which is greater than the sum of the inhibition of the component materials.

TABLE V (AA/HPA + Sulfonated Polystyrene)

| Ratio of AA/HPA: SPS | ppm | % Inhibition CaCO$_3$ | CaSO$_4$ | ppm | Ca$_3$(PO$_4$)$_2$ |
|---|---|---|---|---|---|
| 1:0 | ½ | 0.0 | 13.7 | 2 | 3.9 |
|  | 1 | 9.5 | 31.8 | 4 | 1.7 |
|  | 2 | 32.3 | 97.2 | 8 | 93.3 |
|  | 2.5 | 44.1 | — | — | — |
|  | 5.0 | 61.4 | — | — | — |
|  | 10.0 | 53.3 | — | — | — |
| 0:1 | ½ | 6.4 | 3.8 | 2 | 0.0 |
|  | 1 | 10.1 | 3.9 | 4 | 0.0 |
|  | 2 | 10.1 | 3.8 | 8 | 6.2 |
|  | 2.5 | 0.0 | — | — | — |
|  | 5.0 | 5.3 | — | — | — |
|  | 10.0 | 4.9 | — | — | — |
| 1:1 | ½ | 5.8 | 5.8 | 2 | 0.0 |
|  | 1 | 6.4 | 14.9 | 4 | 3.9 |
|  | 2 | 13.2 | 32.4 | 8 | 20.3 |
|  | 2.5 | 16.7 | — | — | — |
|  | 5.0 | 45.9 | — | — | — |
|  | 10.0 | 57.7 | — | — | — |
| 1:3 | ½ | 6.4 | 5.2 | 2 | 0.0 |
|  | 1 | 11.1 | 9.7 | 4 | 0.0 |
|  | 2 | 5.8 | 16.3 | 8 | 47.1 |
|  | 2.5 | 0.8 | — | — | — |
|  | 5.0 | 25.3 | — | — | — |
|  | 10.0 | 35.2 | — | — | — |
| 3:1 | ½ | 15.3 | 8.3 | 2 | 2.3 |
|  | 1 | 11.6 | 23.1 | 4 | 9.2 |
|  | 2 | 16.9 | 60.5 | 8 | 72.8 |
|  | 2.5 | 40.2 | — | — | — |
|  | 5.0 | 60.1 | — | — | — |
|  | 10.0 | 36.9 | — | — | — |

AA/HPA = same as in Table I
SPS = "Versa TL-70", sulfonated polystyrene, molecular weight ≈ 70,000

TABLE VI (AA/HPA + Sulfonated Polystyrene—Calcium Phosphate Inhibition)

| Material | ppm (active) | % Inhibition |
|---|---|---|
| AA/HPA | 4.0 | 1.7 |
| SPS | 4.0 | 0.0 |
| AA/HPA | 4.0 | } 20.3 |
| SPS | 4.0 | |
| AA/HPA | 2.0 | 3.9 |
| SPS | 6.0 | 3.0 |
| AA/HPA | 2.0 | } 47.1 |
| SPS | 6.0 | |
| AA/HPA | 1.75 | 3.0 |
| SPS | 5.25 | 2.0 |
| AA/HPA | 1.75 | } 26.0 |
| SPS | 5.25 | |
| AA/HPA | 6 | 40.0 |
| SPS | 2 | 0.0 |
| AA/HPA | 6 | } 72.8 |
| SPS | 2 | |
| AA/HPA | 5.25 | 28.0 |
| SPS | 1.75 | 0.0 |
| AA/HPA | 5.25 | } 50.0 |
| SPS | 1.75 | |

AA/HPA = same as Table I
SPS = same as Table V

From Table VI, it is clearly shown that the inhibition resulting from the combined AA/HPA-SPS treatment, in calcium phosphate inhibition, is greater than the sum of the component materials. Table V indicates that this particular combined treatment is quite effective in calcium phosphate, calcium carbonate and calcium sulfate inhibition.

TABLE VII (AA/HPA and Polymaleic Anhydride)

| Ratio of AA/HPA: PMA | ppm | % Inhibition CaCO$_3$ | CaSO$_4$ | ppm | Ca$_3$(PO$_4$)$_2$ |
|---|---|---|---|---|---|
| 1:0 | ½ | 0.0 | 12.4 | 2 | 2.7 |
|  | 1 | 0.0 | 31.2 | 4 | 9.7 |
|  | 2 | 27.7 | 96.5 | 5 | 7.8 |
|  | 2.5 | 48.3 | — | 8 | 71.4 |
|  | 5.0 | 62.9 | — | 10 | 88.9 |
|  | 10.0 | 56.8 | — | 20 | 95.5 |
| 0:1 | ½ | 4.5 | 14.4 | 2 | 1.6 |
|  | 1 | 23.2 | 72.0 | 4 | 7.7 |
|  | 2 | 38.3 | 99.0 | 5 | 10.1 |
|  | 2.5 | 64.1 | — | 8 | 11.8 |
|  | 5.0 | 83.0 | — | 10 | 9.1 |
|  | 10.0 | 88.4 | — | 20 | 12.6 |
| 1:1 | ½ | 4.5 | 17.0 | 2 | 1.2 |
|  | 1 | 11.6 | 54.5 | 4 | 14.4 |
|  | 2 | 32.8 | 98.6 | 5 | 5.8 |
|  | 2.5 | 57.4 | — | 8 | 18.2 |
|  | 5.0 | 67.1 | — | 10 | 30.2 |
|  | 10.0 | 88.4 | — | 20 | 91.3 |
| 1:3 | ½ | 3.5 | 18.9 | 2 | 5.2 |
|  | 1 | 19.1 | 58.8 | 4 | 10.5 |
|  | 2 | 35.7 | 98.9 | 5 | 5.3 |
|  | 2.5 | 51.9 | — | 8 | 14.4 |
|  | 5.0 | 68.4 | — | 10 | 25.4 |
|  | 10.0 | 86.0 | — | 20 | 83.8 |
| 3:1 | ½ | 7.1 | 12.5 | 2 | 4.8 |
|  | 1 | 1.0 | 52.1 | 4 | 3.1 |
|  | 2 | 27.7 | 98.8 | 5 | 5.6 |
|  | 2.5 | 55.0 | — | 8 | 56.3 |
|  | 5.0 | 69.6 | — | 10 | 95.5 |
|  | 10.0 | 90.3 | — | 20 | 92.5 |

AA/HPA = same as Table I
PMA = "Belclene 200" - Ciba Geigy - polymaleic anhydride, molecular weight ≈ 800–1000.

Table VII indicates that the combined AA/HPA and PMA treatment is effective as an inhibitor of calcium carbonate, calcium sulfate, and calcium phosphate salt formation. It is especially noteworthy that in the 1:1, 1:3, and 3:1 molar ratio (AA/HPA:PMA) range, the combined treatment is highly efficacious. For instance, within these molar ranges, a combined treatment of from around 10-20 ppm, in most instances, shows an extremely high level of inhibition (about 80% and greater). Accordingly, the AA/HPA-PMA treatment is preferred.

TABLE VIII (AA/HPA - PMA, $CaCO_3$ Precipitation)

| Material | ppm (active) | % Inhibition |
|---|---|---|
| AA/HPA | 1.0 | 0.0 |
| PMA | 1.0 | 23.0 |
| AA/HPA | 1.0 | }  33.0 |
| PMA | 1.0 | |
| AA/HPA | 0.2 | 0.0 |
| PMA | 0.6 | 7.0 |
| AA/HPA | 0.2 | }  14.0 |
| PMA | 0.6 | |
| AA/HPA | 1.5 | 6.0 |
| PMA | 0.5 | 5.0 |
| AA/HPA | 1.5 | }  28.0 |
| PMA | 0.5 | |

AA/HPA = same as Table I
PMA = same as Table VII

Table VIII clearly illustrates that the calcium carbonate inhibition provided by the combined AA/HPA-PMA treatment is greater than the sum of the component materials. Similar results are shown in the following Tables IX and X, which respectively are concerned with additional calcium sulfate and calcium phosphate inhibition tests.

TABLE IX (AA/HPA - PMA, $CaSO_4$ Inhibition)

| Material | ppm (active) | % Inhibition |
|---|---|---|
| AA/HPA | 0.4 | 7.0 |
| PMA | 0.4 | 9.0 |
| AA/HPA | 0.4 | }  36.0 |
| PMA | 0.4 | |
| AA/HPA | 0.6 | 13.0 |
| PMA | 0.6 | 20.0 |
| AA/HPA | 0.6 | }  70.0 |
| PMA | 0.6 | |
| AA/HPA | 0.2 | 2.0 |
| PMA | 0.6 | 20.0 |
| AA/HPA | 0.2 | }  40.0 / 40.0 |
| PMA | 0.6 | |
| AA/HPA | 0.3 | 5.0 |
| PMA | 0.9 | 51.0 |
| AA/HPA | 0.3 | }  76.0 |
| PMA | 0.9 | |
| AA/HPA | 0.6 | 13.0 |
| PMA | 0.2 | 3.0 |
| AA/HPA | 0.6 | }  31.0 |
| PMA | 0.2 | |
| AA/HPA | 0.9 | 26.0 |
| PMA | 0.3 | 5.0 |
| AA/HPA | 0.9 | }  69.0 |
| PMA | 0.3 | |

AA/HPA = same as in Table I
PMA = same as in Table VII

TABLE X (AA/HPA + PMA, $Ca_3(PO_4)_2$ Inhibition)

| Material | ppm (active) | % Inhibition |
|---|---|---|
| AA/HPA | 2.0 | 2.7 |
| PMA | 2.0 | 1.6 |
| AA/HPA | 2.0 | }  14.4 |
| PMA | 2.0 | |
| AA/HPA | 5.0 | 7.8 |
| PMA | 5.0 | 10.1 |
| AA/HPA | 5.0 | }  30.2 |
| PMA | 5.0 | |

AA/HPA = same as in Table I
PMA = same as in Table VII

In order to demonstrate the effectiveness of the combined treatment composition and method in dispersing suspended particulate matter, the following procedures using $Fe_2O_3$ and clay, separately, as suspended solids, were undertaken. The results appear in the following tables. In the results, it is noted that increasing $\Delta\%$ T values indicate better treatment as more particles remain suspended in the aqueous medium.

CLAY DISPERSION (KAOLIN) PROCEDURE

| Conditions | Solutions |
|---|---|
| T = 25° C. | 0.1% solution Hydrite UF in $DIH_2O$ |
| pH = 7.5 | 3.68g $CaCl_2.2H_2O$/100 ml $DIH_2O$ |
| 200 ppm $Ca^{+2}$ as $CaCO_3$ | |

Procedure (1) Prepare a suspension of 0.1% Hydrite UF in $DIH_2O$.
(2) Adjust hardness to 200 ppm $Ca^{+2}$ as $CaCO_3$ using $CaCl_2.2H_2O$ solution - 8 ml/1000 ml of Hydrite solution.
(3) Using overhead mixer, mix suspension ½ hour at 1000 rpms.
(4) Remove solution to magnetic stirrer and adjust to pH 7.5 (about 20 minutes to stabilize pH).
(5) Return solution to overhead mixer.
(6) Take 90 ml aliquots of suspension and place 4 oz. glass bottle.
(7) Add treatment and DI water to bring total volume to 100 ml.
(8) Cap bottle, invert several times and place on reciprocating shaker at a moderate speed of about 40 spm for ½ hour.
(9) Place on vibration-proof surface and allow to stand 18 hours.
(10) Without disturbing settled phase, pipet the top 40 mls off the sample. Place in a cell and read % T (at 415 nm). Calculation $\Delta\%T = \%T$ (control) $- \%T$ (treated)

$Fe_2O_3$ DISPERSION PROCEDURE

| Conditions | Solutions |
|---|---|
| T = 25° C. | 0.1% solution $Fe_2O_3$ in $DIH_2O$ |
| pH = 7.5 | 3.68g $CaCl_2.2H_2O$/100 ml $DIH_2O$ |
| 200 ppm $Ca^{+2}$ as $CaCO_3$ | |

Procedure (1) Prepare a suspension of 0.1% $Fe_2O_3$ in $DIH_2O$.

(2) Adjust hardness to 200 ppm $Ca^{+2}$ as $CaCO_3$ using $CaCl_2.2H_2O$ solution - 8 ml/1000 ml of $Fe_2O_3$ solution.
(3) Using overhead mixer, mix suspension ½ hour at 1000 rpms.
(4) Remove solution to magnetic stirrer and adjust to pH 7.5 (about 20 minutes to stabilize pH).
(5) Return solution to overhead mixer.
(6) Take 90 ml aliquots of suspension and place 4 oz. glass bottle.
(7) Add treatment and DI water to bring total volume to 100 ml.
(8) Cap bottle, invert several times and place on reciprocating shaker at a moderate speed of about 40 spm for ½ hour.
(9) Place on vibration-proof surface and allow to stand 18 hours.
(10) Without disturbing settled phase, pipet the top 40 mls off the sample. Place in a cell and read %T (at 415 nm).

Calculation $\Delta \%T = \%T$ (control) $- \%T$ (treated)

TABLE XI (AA/HPA - SS/MA, Clay and Iron Oxide Dispersion)

| Molar Ratio AA/HPA:SS/MA | ppm | Δ % T $Fe_2O_3$ | Clay |
|---|---|---|---|
| 1:0 | ½ | 9.5 | 7.3 |
|  | 1 | 24.8 | 20.9 |
|  | 2 | 54.2 | 52.1 |
| 0:1 | ½ | 3.1 | 8.0 |
|  | 1 | 14.9 | 18.8 |
|  | 2 | 44.1 | 50.8 |
| 1:1 | ½ | 0.1 | 9.9 |
|  | 1 | 17.0 | 32.9 |
|  | 2 | 43.1 | 40.8 |
| 1:3 | ½ | 1.2 | 8.8 |
|  | 1 | 17.0 | 36.9 |
|  | 2 | 49.6 | 44.8 |
| 3:1 | ½ | 3.1 | 9.8 |
|  | 1 | 17.2 | 20.9 |
|  | 2 | 34.3 | 37.8 |

AA/HPA = same as in Table I
SS/MA = same as in Table I

Here, it can be seen that the combined treatment of AA/HPA - SS/MA is also effective as a dispersant for clay and iron oxide particles.

TABLE XII (AA/HPA - SMA, Clay and Iron Oxide Dispersion)

| Molar Ratio AA/HPA:SMA | ppm | Δ % T $Fe_2O_3$ | ppm | Clay |
|---|---|---|---|---|
| 1:0 | ½ | 1.4 | ½ | 10.1 |
|  | 1 | 17.3 | 1 | 17.4* |
|  | 2 | 51.3 | 2 | 39.2 |
|  | 2.5 | 29.4 | 2.5 | 42.5 |
|  | 5.0 | 76.6 |  |  |
|  | 10.0 | 81.4 | 5.0 | 50.0 |
| 0:1 | ½ | 0.8 | ½ | 7.3 |
|  | 1 | 3.3 | 1 | 12.3* |
|  | 2 | 6.0 | 2 | 12.2 |
|  | 2.5 | 21.1 | 2.5 | 32.0 |
|  | 5.0 | 18.2 | 5.0 | 30.0 |
|  | 10.0 | 15.1 |  |  |
| 1:1 | ½ | 3.4 | ½ | 8.4 |
|  | 1 | 7.1 | 1 | 19.0* |
|  | 2 | 15.4 | 2 | 22.0 |
|  | 2.5 | 12.4 | 2.5 | 56.7 |
|  | 5.0 | 44.2 |  |  |
|  | 10.0 | 62.7 | 5.0 | 61.0 |
| 1:3 | ½ | 0.6 | ½ | 10.3 |

TABLE XII-continued (AA/HPA - SMA, Clay and Iron Oxide Dispersion)

| Molar Ratio AA/HPA:SMA | ppm | Δ % T $Fe_2O_3$ | ppm | Clay |
|---|---|---|---|---|
|  | 1 | 3.8 | 1 | 15.6* |
|  | 2 | 8.3 | 2 | 15.3 |
|  | 2.5 | 12.0 | 2.5 | 46.7 |
|  | 5.0 | 21.0 |  |  |
|  | 10.0 | 34.4 | 5.0 | 49.2 |
| 3:1 | ½ | 0.7 | ½ | 10.0 |
|  | 1 | 5.8 | 1 | 14.8* |
|  | 2 | 21.3 | 2 | 34.5 |
|  | 2.5 | 22.8 | 2.5 | 54.7 |
|  | 5.0 | 71.1 | 5.0 | 64.5 |
|  | 10.0 | 81.5 |  |  |

AA/HPA = same as in Table I
SMA = same as in Table III
*Average between 2 trials.

In Table XII it is demonstrated that the combined treatment of AA/HPA - SMA acts as an effective dispersant of iron oxide and clay.

TABLE XIII (AA/HPA - SPS, Clay and Iron Oxide Dispersion Test)

| Molar Ratio AA/HPA:SPS | ppm | Δ % T $Fe_2O_3$ | Clay |
|---|---|---|---|
| 1:0 | ½ | 9.5 | 4.3 |
|  | 1 | 24.8 | 10.8 |
|  | 2 | 54.2 | 48.9 |
| 0:1 | ½ | 0.0 | 0.8 |
|  | 1 | 6.0 | 0.8 |
|  | 2 | 21.8 | 12.7 |
| 1:1 | ½ | 5.0 | 9.9 |
|  | 1 | 17.3 | 8.7 |
|  | 2 | 45.5 | 48.8 |
| 1:3 | ½ | 13.5 | 4.9 |
|  | 1 | 2.5 | 3.8 |
|  | 2 | 22.8 | 34.4 |
| 3:1 | ½ | 5.9 | 4.2 |
|  | 1 | 23.4 | 10.8 |
|  | 2 | 57.1 | 50.9 |

AA/HPA = same as in Table I
SPS = same as in Table V

TABLE XIV (AA/HPA - SPS, Iron Oxide Dispersion Test)

| Material | ppm (active) | Δ % Transmittance |
|---|---|---|
| AA/HPA | 0.5 | 9.5 |
| SPS | 0.5 | 0.0 |
| AA/HPA | 0.5 | 17.3 |
|  |  | 17.3 |
| SPS | 0.5 |  |
| AA/HPA | 1.0 | 24.8 |
| SPS | 1.0 | 6.0 |
| AA/HPA | 1.0 |  |
|  |  | 45.5 |
| SPS | 1.0 |  |
| AA/HPA | 1.125 | 34.0 |
| SPS | 0.375 | 0.0 |
| AA/HPA | 1.125 |  |
|  |  | 52.0 |
| SPS | 0.375 |  |

AA/HPA = same as in Table I
SPS = same as in Table V

Table XIV clearly demonstrates that the dispersant activity of the combined AA/HPA - SPS is greater than the sum of the transmittance values of the component materials.

TABLE XV

(AA/HPS - SPS, Clay Dispersion Test)

| Material | ppm (active) | Δ % Transmittance |
|---|---|---|
| AA/HPA | 1.0 | 10.8 |
| SPS | 1.0 | 0.8 |
| AA/HPA | 1.0 | } 48.8 |
| SPS | 1.0 | |
| AA/HPA | 0.75 | 7.0 |
| SPS | 0.75 | 1.0 |
| AA/HPA | 0.75 | } 20.0 |
| SPS | 0.75 | |
| AA/HPA | 0.5 | 4.3 |
| SPS | 1.5 | 4.0 |
| AA/HPA | 0.5 | } 34.4 |
| SPS | 1.5 | |
| AA/HPA | 0.375 | 3.0 |
| SPS | 1.125 | 1.0 |
| AA/HPA | 0.375 | } 15.0 |
| SPS | 1.125 | |
| AA/HPA | 1.5 | 25.0 |
| SPS | 0.5 | 0.8 |
| AA/HPA | 1.5 | } 50.9 |
| SPS | 0.5 | |
| AA/HPA | 1.125 | 13.0 |
| SPS | 0.375 | 0.6 |
| AA/HPA | 1.125 | } 26.0 |
| SPS | 0.375 | |

AA/HPA = same as in Table I
SPS = same as in Table V

Once again, it is demonstrated in Table XV that the combined treatment of AA/HPA - SPS is synergistic in that the clay transmittance values of the combined treatment are greater than the sum of the individual component transmittance values.

TABLE XVI

(AA/HPA - PMA, Clay and Iron Oxide Dispersant Tests)

| Molar Ratio AA/HPA:PMA | ppm | Δ % T Fe₂O₃ | ppm | Clay |
|---|---|---|---|---|
| 1:0 | ½ | 1.4 | ½ | 10.1 |
| | 1 | 17.3 | 1 | 20.0* |
| | 2 | 51.3 | 2 | 39.2 |
| | 2.5 | 16.0 | 2.5 | 44.7 |
| | 5.0 | 53.3 | | |
| | 10.0 | 57.3 | 5.0 | 54.0 |
| 0:1 | ½ | 0.0 | ½ | 0.7 |
| | 1 | 0.6 | 1 | 1.8* |
| | 2 | 1.5 | 2 | 2.3 |
| | 2.5 | 0.0 | 2.5 | 1.5 |
| | 5.0 | 2.0 | | |
| | 10.0 | 14.8 | 5.0 | 5.5 |
| 1:1 | ½ | 0.7 | ½ | 5.0 |
| | 1 | 4.7 | 1 | 7.9* |
| | 2 | 5.7 | 2 | 12.9 |
| | 2.5 | 0.5 | 2.5 | 22.7 |
| | 5.0 | 18.0 | | |
| | 10.0 | 66.3 | 5.0 | 41.7 |
| 1:3 | ½ | 0.6 | ½ | 2.3 |
| | 1 | 2.8 | 1 | 3.2* |
| | 2 | 3.2 | 2 | 10.6 |
| | 2.5 | 0.0 | 2.5 | 9.0 |
| | 5.0 | 7.0 | | |
| | 10.0 | 26.3 | 5.0 | 24.0 |
| 3:1 | ½ | 1.4 | ½ | 9.5 |
| | 1 | 7.2 | 1 | 11.5* |
| | 2 | 16.8 | 2 | 26.3 |
| | 2.5 | 4.0 | 2.5 | 32.0 |
| | 5.0 | 50.0 | 5.0 | 46.5 |

TABLE XVI-continued

(AA/HPA - PMA, Clay and Iron Oxide Dispersant Tests)

| Molar Ratio AA/HPA:PMA | ppm | Δ % T Fe₂O₃ | ppm | Clay |
|---|---|---|---|---|
| | 10.0 | 65.8 | | |

AA/HPA = same as in Table I
PMA = same as in Table VII
*Average for two trials.

Here, it can be seen that at a 10 ppm treatment level in both the 1:1 and 3:1 (molar ratio AA/HPA-PMA) range, the combined treatment is especially efficacious in iron oxide dispersion capabilities.

While we have shown and described herein certain embodiments of the present invention, it is intended that there be covered as well any change or modification therein which may be made without departing from the spirit and scope of the invention as defined in the appended claims.

We claim:

1. Method of controlling the deposition of scale imparting precipitates on the structural parts of a system exposed to an aqueous medium containing scale imparting precipitates under deposit forming conditions, said scale imparting precipitates being selected from the group consisting of calcium carbonate, calcium phosphate, and calcium sulfate, and mixtures thereof, said method comprising adding to said aqueous medium an effective amount for the purpose of a water soluble polymer (I) comprising a copolymer of acrylic acid or water soluble salt thereof and 2 hydroxypropylacrylate or hydroxyethylacrylate wherein said polymer (I) has a molecular weight of from about 500 to 1,000,000, and also adding to said aqueous medium an effective amount of a water soluble polymer (III) or water soluble salt or hydrolysate acid form thereof, said polymer (III) comprising a sulfonated styrene/maleic anhydride copolymer having the formula

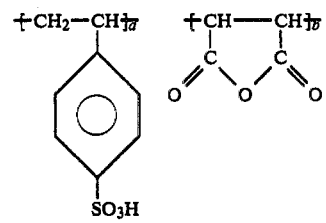

wherein the molar ratio a:b of said polymer (II) is about 3:1 and wherein the molecular weight of said polymer (II) is about 1500 and wherein the molar ratio of polymer (I) to polymer (II) is about 10:1 to 1:10 and wherein said polymer (I) and (II) are added to said aqueous medium in an amount of about 0.1-500 parts polymer (I) and (II) per million parts of said aqueous medium.

2. Method as defined in claim 1 wherein said system is a steam generating system.

3. Method as defined in claim 1 wherein said system is a cooling water system.

4. Method of controlling the deposition of scale imparting precipitates on the structural parts of a system exposed to an aqueous medium containing scale imparting precipitates under deposit forming conditions, said scale imparting precipitates being selected from the group consisting of calcium carbonate, calcium phosphate, and calcium sulfate, and mixtures thereof, said method comprising adding to said aqueous medium an effective amount for the purpose of a water soluble polymer (I) comprising a copolymer of acrylic acid or water soluble salt thereof and 2-hydroxypropylacrylate or hydroxyethylacrylate wherein said polymer (I) has a molecular weight of from about 500 to 1,000,000, and also adding to said aqueous medium an effective amount of a water soluble polymer (II) or water soluble salt or hydrolysate acid form thereof, said polymer (II) comprising a styrene/maleic anhydride copolymer having the formula

wherein the molar ratio a:b in said polymer (II) is about 1:1 and wherein the molecular weight of said polymer (II) is about 1600 and wherein the molar ratio of polymer (I) to polymer (II) is about 10:1 to 1:10 and wherein said polymer (I) and (II) are added to said aqueous medium in an amount of about 0.1–500 parts polymer (I) and (II) per million parts of said aqueous medium.

5. Method as defined in claim 4 wherein said system is a steam generating system.

6. Method as defined in claim 4 wherein said system is a cooling water system.

7. Method of controlling the deposition of the scale imparting precipitates on the structural parts of a system exposed to an aqueous medium containing scale imparting precipitates under deposit forming conditions, said scale imparting precipitates being selected from the group consisting of calcium carbonate, calcium phosphate, and calcium sulfate, and mixtures thereof, said method comprising adding to said aqueous medium an effective amount for the purpose of a water soluble polymer (I) comprising a copolymer of acrylic acid or water soluble salt thereof and 2-hydroxypropylacrylate or hydroxyethylacrylate wherein said polymer (I) has a molecular weight of from about 500 to 1,000,000, and also adding to said aqueous medium an effective amount of a water soluble polymer (II) or water soluble salt or hydrolysate acid form thereof, said polymer (II) comprising a sulfonated styrene polymer having the formula

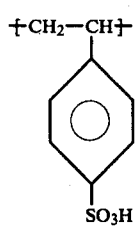

wherein the molecular weight of said polymer (II) is about 70,000, and wherein the molar ratio of polymer (I) to polymer (II) is about 10:1 to 1:10 and wherein said polymer (I) and (II) are added to said aqueous medium in an amount of about 0.1–500 parts polymer (I) and (II) per million parts of said aqueous medium.

8. Method as defined in claim 7 wherein said system is a steam generating system.

9. Method as defined in claim 7 wherein said system is a cooling water system.

10. Method of controlling the deposition of scale imparting precipitates on the structural parts of a system exposed to an aqueous medium containing scale imparting precipitates under deposit forming conditions, said scale imparting precipitates being selected from the group consisting of calcium carbonate, calcium phosphate, and calcium sulfate, and mixtures thereof, said method comprising adding to said aqueous medium an effective amount for the purpose of a water soluble polymer (I) comprising a copolymer of acrylic acid or water soluble salt thereof and 2-hydroxypropylacrylate or hydroxyethylacrylate wherein said polymer (I) has a molecular weight of from about 500 to 1,000,000, and also adding to said aqueous medium an effective amount of a water soluble polymer (II) or water soluble salt or hydrolysate acid form thereof, said polymer (II) comprising a polymaleic anhydride polymer having the formula

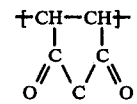

wherein the molecular weight of said polymaleic anhydride is about 800–1,000, and wherein the molar ratio of polymer (I) to polymer (II) is about 10:1 to 1:10 and wherein said polymer (I) and (II) are added to said aqueous medium in an amount of about 0.1–500 parts polymer (I) and (II) per million parts of said aqueous medium.

11. Method as defined in claim 10 wherein said system is a steam generating system.

12. Method as defined in claim 10 wherein said system is a cooling water system.

13. A method of dispersing and maintaining dispersed particulate matter in a system having an aqueous medium which contains particulate matter selected from the group consisting of clay and iron oxide and mixtures thereof, said method comprising adding to said aqueous medium an effective amount for the purpose of a water soluble polymer (I) comprising a copolymer of acrylic acid or water soluble salt thereof and 2-hydroxypropylacrylate or hydroxyethylacrylate wherein said polymer (I) has a molecular weight of from about 500 to 1,000,000 and also adding to said aqueous medium an effective amount of a water soluble polymer (II) or water soluble salt or hydrolysate acid form thereof, said polymer (II) comprising a sulfonated styrene polymer having the formula

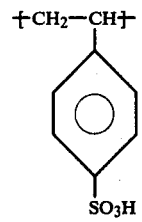

wherein the molecular weight of said polymer (II) is about 70,000, and wherein the molar ratio of polymer (I) to polymer (II) is about 10:1 to 1:10 and wherein said polymer (I) and (II) are added to said aqueous medium in an amount of about 0.1–500 parts polymer (I) and (II) per million parts of said aqueous medium.

14. Method as defined in claim 13 wherein said system is a steam generating system.

15. Method as defined in claim 13 wherein said system is a cooling water system.

* * * * *

UNITED STATES PATENT OFFICE
CERTIFICATE OF CORRECTION

Patent No. 4,374,733　　　　　　　　　　Dated February 22, 1983

Inventor(s) W. R. Snyder et al

It is certified that error appears in the above-identified patent and that said Letters Patent are hereby corrected as shown below:

Column 10, line 34 - change "$\mu$filters" to "$\mu$ filters"

Column 11, line 65 - "(Polymer I and SS/MA (Polymer II" to
　　　　　　　　　　"(Polymer I) and SS/MA (Polymer II)"

Column 18, lines 48 to 52 - the value 17.3 should appear only once in the last column of values, giving:

|  |  |  |
|---|---|---|
| 9.5 | not | 9.5 |
| 0.0 |  | 0.0 |
|  |  | 17.3 |
| 17.3 |  | 17.3 |

Signed and Sealed this

Twelfth Day of July 1983

[SEAL]

Attest:

GERALD J. MOSSINGHOFF

Attesting Officer　　　　　　Commissioner of Patents and Trademarks